INVENTOR
JULIEN DUNGLER
By: Jacobi & Davidson
ATTORNEYS.

United States Patent Office 3,537,238
Patented Nov. 3, 1970

3,537,238
ELECTROSTATIC FILTER FOR THE PURIFICATION OF GASES AND PARTICULARLY OF THE AIR
Julien Dungler, 35 Rittergasse, 4000 Basel, Switzerland
Filed Nov. 14, 1968, Ser. No. 775,613
Claims priority, application France, Nov. 16, 1967, 1,851; May 24, 1968, 1,865
Int. Cl. B03c 3/36
U.S. Cl. 55—131                                 7 Claims

ABSTRACT OF THE DISCLOSURE

An electrostatic precipitator having three electrodes of one electrical potential alternating with three electrodes of opposite electrical potential, each electrode having apertures therethrough, the apertures being staggered in the gas flow direction and a gas permeable ribbon made of non-conductive material arranged between the electrodes.

---

The present invention relates to an electrostatic filter for the purification of gases and particularly of the air, provided with an inlet and an outlet.

These filters, known as such, are in use in the industry, in hospitals and everywhere, where the air must be free of dust and/or germs. In consequence of the different sizes of the particles to be filtered off, the hitherto known filters are varying in their capacity to filter off particles having a diameter of the order of 0.001 mm. Filters being able to filter off such small particles are known. However, they are showing the disadvantages that primarily they are not efficient enough and secondarily that they cannot be permanently operated, as they have to be removed from operation for cleaning purposes. The filter of the present invention does not show the aforementioned disadvantages, as it is characterized by being provided with at least three electrodes in the gas-way positioned vertically to the gas stream direction and having alternating potentials. Between said electrodes an electrostatic field of at least 5000 v./cm. exists, and the electrodes are provided with openings for gas passage forming the sole gas-way through the filter and being arranged in the consecutive electrodes staggered to each other, so that the gas stream streaming through one opening bounces against the next electrode.

In the gas-way a ribbon consisting of gas-permeable, insulating or non-conductive material can be arranged in such a zigzag line that at the one hand it subdivides the space between two neighboring electrodes and on the other hand it is longitudinally movable from the filter outlet to the filter inlet.

In the following three examples of embodiment of electrostatic filters of this invention are described with reference to a drawing.

Figure 1:
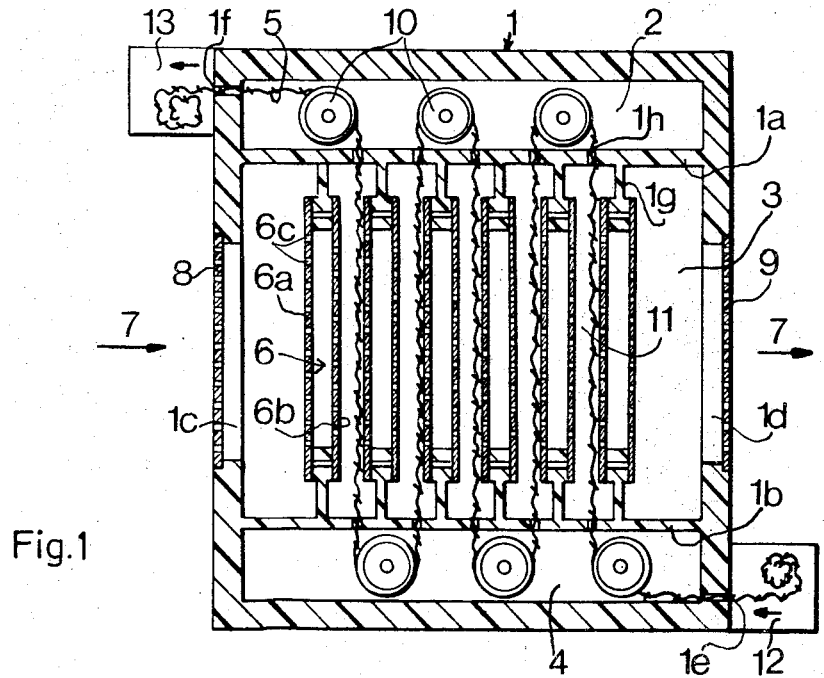
FIG. 1 shows a cross section of a filter provided with case-shaped electrodes.

The casing 1 of the filter shown in FIG. 1 contains three spaces 2, 3 and 4, separated by two walls, 1a and 1b. Furthermore, the casing 1 itself has on the one hand an inlet 1c and an outlet 1d and on the other hand two openings, 1e and 1f, diagonally facing each other, wherethrough a ribbon can be pulled. The partition walls 1a and 1b are provided each with six supports 1g consisting of insulating material each pair of which are carrying one case-shaped electrode 6. Each one of these electrodes 6 has in its walls, 6a and 6b, consisting of conductive material and positioned vertically to the gas flow direction, which is marked by the arrows 7, preferably slot-shaped openings 6c. These openings are arranged staggered to each other in such a way that the gas stream streaming through one opening bounces against the following electrode wall.

Each opening is dimensioned in such a way that the velocity of flow through the opening is at least four times higher than within the area 11 between the electrodes. In the filter inlet is well as in the filter outlet, 1c and 1d, respectively, perforated inlet and outlet plates, 8 and 9, respectively, are arranged. The spaces 2 and 4 are connected to the space 3 by openings 1h. Through these openings or permeable supple element the ribbon 5 is guided, which by means of freely revolving rollers 10 running in bearings in the casing 1 is arranged in a zigzag way. The ribbon, one end of which is wound up on a roller in the winding-off room 12 and the other end in the winding-up room 13, is guided in such a way that on the one hand it is subdividing the space 11 between two neighboring electrodes, respectively, and on the other hand it is movable longitudinally from the filter outlet to the filter inlet. Looking in the direction of the gas flow 7, the ribbon is arranged close to each electrode 6. The first, third and fifth electrodes of the six case-shaped electrodes 6 are connected to a positive pole, while the second, fourth and sixth electrodes are connected to a negative pole of a high voltage power source. The alternating potentials caused thereby have to develop a field strength of at least 5000 v./cm. between the electrodes. A voltage of about 10,000 v. at a distance of one centimeter between the electrodes proves especially favorable for good filtering effect.

The gas to be purified, for example air, is blown or sucked through the electrostatic filter in the direction of the arrows 7 by means of a not shown fan. The gas streams first through the openings of the perforated inlet plate 8 into the first section of the area 3, where it bounces, eventually several times, against the wall 6a of the electrode 6, thereby losing some of its speed. As soon as the gas passes through the opening of the electrode wall 6a, it is accelerated again. In the first electrode the gas becomes partly ionized and at the same time bounces again repeatedly against the wall 6b, till it passes through the openings 6c of this wall. As soon as the gas streams through the openings of the wall 6b, it is additionally speeded up by the electric field and bounces with increased speed against the wall 6a of the following electrode, where again it loses speed, becomes ionized and is once more accelerated. The alternating increase and decrease of velocity, respectively, results in a thorough intermixing of the individual volume parts of the air stream. The more frequently this intermixing takes place the higher is the filtering effect, which results in retaining on the ribbon 5 particles present in the gas stream to a size as small as $10^{-6}$ mm. To remedy this soiling of the ribbon, it is moved longitudinally from the exit side to the entrance side. It may quickly be replaced after use, which involves a short waiting time. The purified gas leaves the filter through the perforated outlet plate 9.

Figure 2:
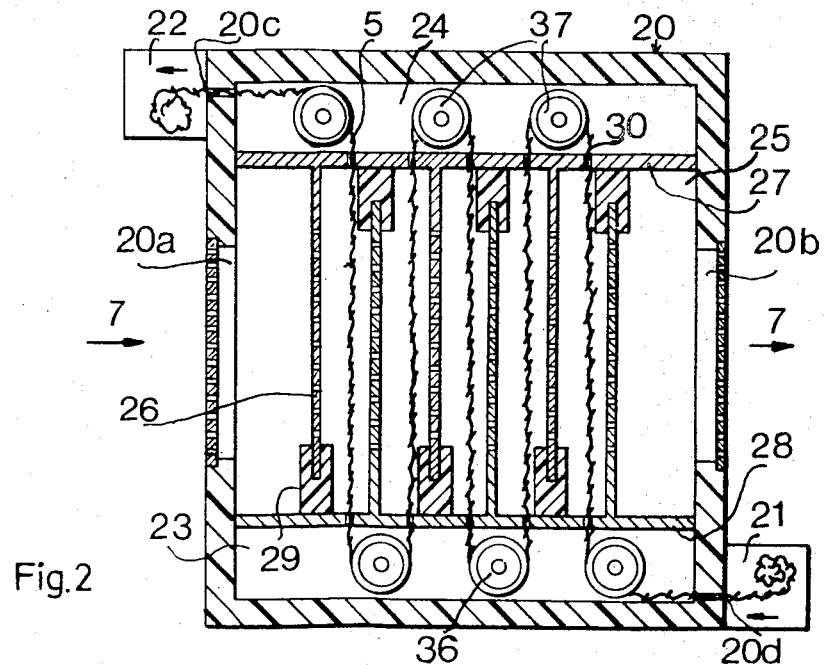
FIG. 2 shows a cross section of a filter with plate-electrodes.

Another embodiment of a filter working in the same way is shown in FIG. 2. The filter-casing made of synthetic or any other insulating material is marked 20, and is provided on the one hand with a filter-housing inlet 20a and an outlet 20b and on the other hand with two openings 20d and 20c. The opening 20d connects the winding-off room 21 with the area 23 containing the return rollers 36, and the opening 20c connects the winding-up room 22 with the area 24 containing the rollers 37. The partition walls 27 and 28 separate the areas 24 and 23, respectively, from the area 25, wherein, fixed to the two partition walls 27 and 28, the plate electrodes 26 are arranged. The partition walls 27 and 28 are made of conductive material, the first, third and fifth electrodes being conductively connected to the partition wall 27, while the second, fourth and sixth electrodes are conductively connected to the partition wall 28. The partition wall 27 is connected to the positive pole and the partition wall 28 to the negative pole of a high voltage power source. The ends of the electrodes, non-conductively connected to the partition walls, are affixed to the latter by insulating elements 29. The ribbon 5 is guided over the rollers 36 and 37 in exactly the same way as before described in the first example of embodiment.

Instead of a ribbon 5 it is also possible to use individual exchangeable inserts to be positioned between each pair of electrodes, and consisting of non-conductive, gas-permeable material, which will be specially advantageous for smaller not continuously operating apparatus.

Figure 3:
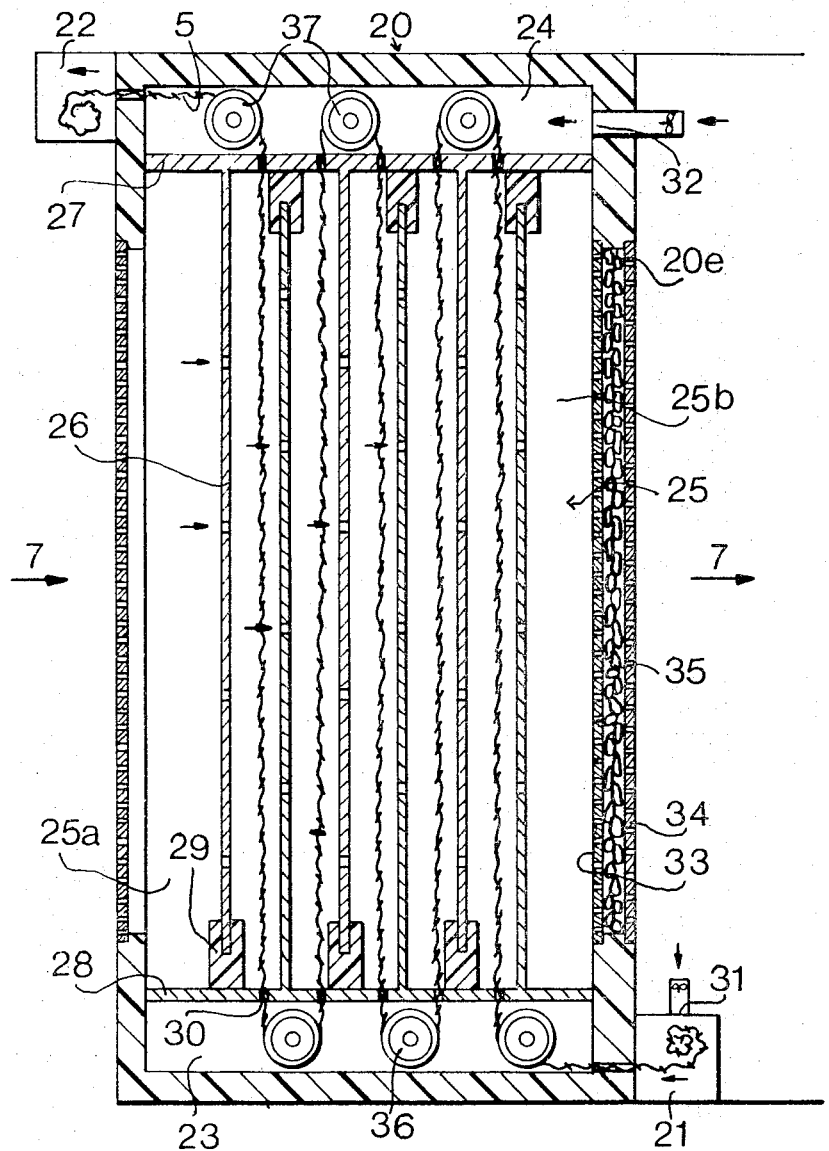
FIG. 3 shows a cross section of a filter provided with electrodes, with overpressure areas and with an exit-filter element of active carbon.

The embodiment represented in FIG. 3 is provided with plate electrodes too. The arrangement of this filter resembles the one of the filter shown in FIG. 2, for which reason the individual parts, as far as they correspond to the parts of the second filter, are marked by the same reference signs. Additionally, this filter shows two openings, 32 and 31, through which the purified air is blown into the areas 24 and 23, respectively, resulting in overpressure, which prevents impurities to pass unfiltered from the first section 25a of the area 25 over the areas 24 or 23 into the last section 25b. The outlet 20e is provided with two gratings, 33 and 34, between which active carbon 35 is inserted.

What I claim is:

1. An electrostatic filter for the purification of gases and particularly of air, provided with an inlet and an outlet opening, comprising at least three electrodes of alternating potentials vertically positioned to the gas flow direction, and between said electrodes an electrostatic field of at least 5000 v./cm.; and said electrodes being provided with openings for the through-flow of the gas, and said openings are the sole gas-way through the filter; said openings being in staggered relation to each other in the consecutive electrodes in such a way that the gas stream flowing through one opening bounces against the following electrode.

2. An electrostatic filter according to claim 1, wherein a gas-permeable ribbon made of non-conductive material is arranged in such a zigzag way that at the one hand the area between two following electrodes is subdivided and on the other hand said ribbon is longitudinally movable from the filter outlet to the filter inlet.

3. An electrostatic filter according to claim 1, wherein the openings in each electrode are dimensioned in such a way that the speed of the particles in the openings is at least four times higher than their speed in the area between the electrodes.

4. An electrostatic filter according to claim 2, wherein the ribbon is arranged closely in front of a respective electrode, seen in the gas stream direction.

5. An electrostatic filter according to claim 1, wherein between two electrodes one insert each, made of non-conductive, gas-permeable material, is positioned.

6. An electrostatic filter according to claim 2 wherein the openings in each electrode are dimensioned in such a way that the speed of the particles in the openings is at least four times higher than their speed in the area between the electrodes.

7. An electrostatic filter according to claim 3 wherein the ribbon is arranged closely in front of a respective electrode, seen in the gas stream direction.

References Cited

UNITED STATES PATENTS

| 2,225,677 | 12/1940 | White | 55—131 X |
| 2,974,747 | 3/1961 | Coolidge et al. | 55—124 X |
| 3,375,638 | 4/1968 | Dungler | 55—149 X |

FOREIGN PATENTS 581,530   9/1924   France.

DENNIS E. TALBERT, Primary Examiner

U.S. Cl. X.R.

55—120, 124, 136, 149, 155, 316, 354, 462